UNITED STATES PATENT OFFICE.

OTTO LUDWIG AHRENS, OF HAMBURG, GERMANY.

PROCESS OF PRESERVING MEAT.

1,007,908. Specification of Letters Patent. Patented Nov. 7, 1911.

No Drawing. Application filed May 2, 1911. Serial No. 624,603.

*To all whom it may concern:*

Be it known that I, OTTO LUDWIG AHRENS, a subject of the German Emperor, residing at Wandsbekerstieg 47ᶜ, Hamburg, 24, Germany, have invented a certain new and useful Process of Preserving Meat, of which the following is a specification.

This invention relates to a process for preserving raw meat by treating it with hot fat. In existing processes of this nature the meat is placed in the hot fat and allowed to remain in it until the fat has become cold and set. By this means a thick coating of congealed fat is formed on the meat, by which the meat is intended to be enveloped air-tight and preserved. A process of that kind, however, is not suitable for practical use. Apart from the fact that the process is much too expensive because it requires large quantities of fat, it is also quite unreliable because the coating of congealed fat enveloping the meat is brittle, very soon cracks and breaks off, so that the preserving action is destroyed.

Now according to the present invention the meat is dipped into fat heated to about 200° C., and is then taken out. By this dipping into the hot fat a part of the water contained in the outer layer of the meat is expelled, and when the meat is taken out of the hot fat the expelled water runs off together with the fat from the surface of the meat.

Since the water contained in the fibrous layers of the meat is held very tenaciously, only a small portion of the water contained in the outer layer of the meat will be expelled by one dipping of the meat into the hot fat. The meat must therefore be repeatedly dipped, and applicant has discovered that the water contained in the outer layer of the meat can be completely expelled by dipping the meat six, eight or twelve times or oftener, according to the size of the pieces of meat, into fat heated to about 200° C., and allowing the expelled water to run off together with the fat before each dipping. By this means raw meat is produced having an outer layer of a thickness of about 3 to 6 mm. which is sterilized and completely free from water and which will protect the meat from going bad for a long time, especially when it is stored in a covering of water-tight material.

Meat which is intended for provisioning ships or for similar purposes is preferably subjected to a supplementary treatment consisting in placing the meat treated as above described into a vessel provided with two tubular openings. The vessel is then filled with fat heated to about 150° C. and the cover is inclosed air-tight. The hot fat is then completely driven out of the vessel through one tubular opening by means of carbonic acid or other neutral gas introduced under pressure through the other tubular opening, and the tubular openings are then closed air-tight. The meat so treated in this vessel can be kept in the latter for an unlimited period without going bad or losing the character of raw meat. Since the meat is completely cut off from the air in the sterilized interior of the vessel, it can be stored in any place even in moist air and it will not be affected by climatic conditions.

Having now described my invention what I claim as new and desire to secure by Letters Patent is:—

1. A process for preserving raw meat which comprises dipping the meat repeatedly into fat heated to about 200° C. and allowing the expelled water to run off together with the fat each time the meat is taken out of the hot fat, until the water contained in the outer layer of the meat has been completely expelled.

2. A process for preserving raw meat which comprises dipping the meat repeatedly into fat heated to about 200° C. and allowing the expelled water to run off together with the fat each time the meat is taken out of the hot fat, until the water contained in the outer layer of the meat has been completely expelled, placing the meat into a vessel filled with hot fat, closing the vessel air tight, and driving out the hot fat by a neutral gas.

Signed by me at Hamburg Germany this twelfth day of April 1911.

OTTO LUDWIG AHRENS.

Witnesses:
AUGUST WENK,
ERNEST H. L. MUMMENHOFF.

Copies of this patent may be obtained for five cents each, by addressing the "Commissioner of Patents, Washington, D. C."